UNITED STATES PATENT OFFICE 1,924,764

PROCESS OF PREPARING ALIPHATIC CARBOXYLIC ACIDS FROM OLEFINIC HYDROCARBONS, CARBON MONOXIDE AND STEAM

Walter E. Vail, Wilmington, Del., assignor to E. I. du Pont de Nemours & Company, Wilmington, Del., a corporation of Delaware No Drawing. Application December 31, 1931
Serial No. 584,294

8 Claims. (Cl. 260—116)

This invention relates to the synthesis of organic compounds and particularly to the preparation of aliphatic carboxylic acids by the interaction of olefines, carbon monoxide, and steam. Aliphatic acids of the higher order such as propionic acid, butyric acid, etc., have been heretofore prepared by various methods. For example, propionic acid has been obtained by the reduction of acrylic or lactic acid; by suitable Schizomycetes fermentation of the lactate or malate of calcium; or by the oxidation of propyl alcohol with dichromate solution. Such methods of preparation are necessarily expensive due principally to the relatively high cost of the raw materials. Owing to the many important uses to which acids of this type are adaptable, many of which uses have not been exploited extensively due to their present high cost, it is obvious that a process for their preparation from raw materials, which are, at present, readily available and which will be even more readily available in the near future, will be of far reaching importance in this art.

In the copending application of Gilbert B. Carpenter Ser. No. 559,130, a process is described for the preparation of aliphatic carboxylic acids of the higher order by the reaction of steam, carbon monoxide, and an olefinic hydrocarbon, i. e. an aliphatic hydrocarbon containing a double bond, —for example, the olefines ethylene, propylene, butylene, etc,—the synthesis producing from these olefines propionic, butyric, and valeric acids respectively. The acid produced contains one more carbon atom than the unsaturated hydrocarbon treated.

An object of the present invention is to provide a process for the preparation of aliphatic carboxylic acids from steam, carbon monoxide, and olefinic hydrocarbons. A further object of this invention is to provide a process for the preparation of monocarboxylic acids from steam, carbon monoxide and an olefine in the presence of a catalyst. Another object of the invention is to provide a process for the preparation of acids having the structural formula—

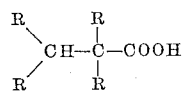

from steam, carbon monoxide, and an olefinic hydrocarbon, the R indicating hydrogen or a substituted or unsubstituted similar or dissimilar alkyl or aralkyl grouping. Other objects and advantages will hereinafter appear.

According to the present invention, aliphatic carboxylic acids are prepared from steam, carbon monoxide, and an olefinic hydrocarbon by passing these materials in the vapor phase over a boron phosphate catalyst. This catalyst may be supported or not, as desired, altho generally it is preferable to support it on the usual type of catalyst support such, for example, as charcoal, fuller's earth, kieselguhr, etc.

Raw materials suitable for use in the process are readily available from a number of sources. Thus, ethylene and various homologues thereof are found in the gases evolved in cracking petroleum and may be separated therefrom, for example, by fractional liquefaction. It is preferable, for the sake of avoiding undesirable by-products, that the hydrocarbon which it is desired to convert be employed in a relatively high degree of purity.

The carbon monoxide required for the synthesis may conveniently be derived from various commercial sources, such as, for example, water-gas, producer gas, etc., by liquefaction or other methods, and should likewise for the best results be relatively pure.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

The relative proportions of the reactants can be varied although it has been found that very advantageous results are obtained when the steam and carbon monoxide are in excess with respect to the olefinic hydrocarbon. Concentrations of the latter within the range of from 1½ to 10% by volume of the total reactants have been employed with good results.

The use of pressures in excess of atmospheric, say from 25 to 900 atmospheres, is preferred. The reaction proceeds over a wide range of temperatures although the optimum temperature varies with specific cases, depending inter alia upon the hydrocarbon being used. Generally the desired reaction can be obtained at from 200° to 400° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 275° to 375° C.

The following example will illustrate one method of practicing the invention, although the invention is not limited to the example.

*Example.*—A gaseous mixture consisting of 69% carbon monoxide, 3.6% ethylene, 2.4% inerts, and 25% steam, all percentages by volume, were passed at a temperature of approximately 325° C. and a pressure of approximately 700 atmospheres over a boron phosphate catalyst. The catalyst was prepared in the following manner: 7.4 parts by weight boric acid was dissolved in hot water and the resulting solution mixed with 12.6 parts by weight of 85% phosphoric acid. The volume was then made up to 60 parts with water. 50 parts by weight of hot activated charcoal was thoroughly impregnated with this solution, at boiling temperature, and the thus impregnated charcoal finally dried at 120° C. The prepared catalyst was then disposed in a reaction chamber suitable for conducting exothermic reactions. The total overall efficiency calculated on the ethylene converted was approximately 80%.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, copper, manganese, or nickel.

Various changes may be made in the method hereinbefore described without departing from the invention or sacrificing the advantages thereof.

I claim:

1. In a process for the preparation of aliphatic carboxylic acids from steam, carbon monoxide, and an olefinic hydrocarbon the step which comprises effecting the reaction in the presence of boron phosphate.

2. In a process for the preparation of aliphatic carboxylic acids from a gaseous mixture containing steam, carbon monoxide, and an olefinic hydrocarbon the step which comprises passing the gaseous mixture over a boron phosphate catalyst.

3. In a process for the preparation of aliphatic carboxylic acids from steam, carbon monoxide, and an olefinic hydrocarbon, the step which comprises effecting the reaction in the presence of a boron phosphate catalyst supported on activated charcoal.

4. In a process for the preparation of aliphatic carboxylic acids from a gaseous mixture containing steam, carbon monoxide, and an olefinic hydrocarbon, the step which comprises contacting the gaseous mixture with a catalyst comprising boron phosphate supported upon activated charcoal.

5. In a process for the preparation of propionic acid from a gaseous mixture containing steam, carbon monoxide, and ethylene, the step which comprises passing the gaseous mixture over a boron phosphate catalyst.

6. In a process for the preparation of propionic acid from a gaseous mixture containing steam, carbon monoxide, and ethylene, the step which comprises effecting the reaction in the presence of activated charcoal impregnated with boron phosphate.

7. In a process for the preparation of propionic acid at a temperature of approximately 325° C. and a pressure of approximately 700 atmospheres from a gaseous mixture consisting of 69% carbon monoxide, 3.6% ethylene, 2.4% inerts, and 25% steam, the step which comprises effecting the reaction in the presence of a boron phosphate catalyst.

8. In a process for the preparation of aliphatic carboxylic acids from a gaseous mixture containing carbon monoxide, steam, and from one-half to ten per cent. of an olefinic hydrocarbon, the reaction being effected at a temperature of approximately 325° C. and a pressure of approximately 700 atmospheres, the step which comprises effecting the reaction in the presence of a boron phosphate catalyst supported on activated charcoal.

WALTER E. VAIL.